US012183501B2

(12) United States Patent
Shimoda et al.

(10) Patent No.: US 12,183,501 B2
(45) Date of Patent: Dec. 31, 2024

(54) INDUCTOR COMPONENT

(71) Applicant: Murata Manufacturing Co., Ltd., Kyoto-fu (JP)

(72) Inventors: Yuta Shimoda, Nagaokakyo (JP); Tomohiro Kido, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/497,669

(22) Filed: Oct. 8, 2021

(65) Prior Publication Data

US 2022/0028602 A1 Jan. 27, 2022

Related U.S. Application Data

(62) Division of application No. 16/039,023, filed on Jul. 18, 2018, now Pat. No. 11,170,930.

(30) Foreign Application Priority Data

Aug. 10, 2017 (JP) ................................ 2017-155697

(51) Int. Cl.
*H01F 27/30* (2006.01)
*H01F 17/00* (2006.01)
(Continued)

(52) U.S. Cl.
CPC ......... *H01F 27/30* (2013.01); *H01F 17/0013* (2013.01); *H01F 27/2852* (2013.01);
(Continued)

(58) Field of Classification Search
CPC .. H01F 27/30; H01F 17/0013; H01F 27/2852; H01F 27/292; H01F 27/323; H01F 41/043
See application file for complete search history.

(56) References Cited

U.S. PATENT DOCUMENTS 10,312,014 B2 6/2019 Lee
2008/0257488 A1* 10/2008 Yamano ................ H01F 41/122 156/274.2
(Continued)

FOREIGN PATENT DOCUMENTS

CN 101361146 A 2/2009
CN 106062904 A 10/2016
(Continued)

OTHER PUBLICATIONS

An Office Action; "Notification of Reasons for Refusal," Mailed by the Japanese Patent Office on Sep. 17, 2019, which corresponds to Japanese Patent Application No. 2017-155697 and is related to U.S. Appl. No. 16/039,023; with English language translation.
(Continued)

*Primary Examiner* — Malcolm Barnes
(74) *Attorney, Agent, or Firm* — Studebaker & Brackett PC

(57) ABSTRACT

An inductor component comprising an element body including a first end surface and a second end surface opposite to each other, and a bottom surface connected between the first end surface and the second end surface; a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil. The first external electrode has an end edge extending in a direction orthogonal to the vertical plane, and the end edge is formed into an uneven shape.

23 Claims, 7 Drawing Sheets

(51) Int. Cl.

| | |
|---|---|
| ***H01F 27/28*** | (2006.01) |
| ***H01F 27/29*** | (2006.01) |
| ***H01F 27/32*** | (2006.01) |
| ***H01F 41/04*** | (2006.01) |

(52) U.S. Cl.
CPC ......... *H01F 27/292* (2013.01); *H01F 27/323* (2013.01); *H01F 41/043* (2013.01)

(56) References Cited

U.S. PATENT DOCUMENTS

| | | | | |
|---|---|---|---|---|
| 2014/0285306 | A1* | 9/2014 | Sasaki | H01F 27/2804 336/200 |
| 2015/0048915 | A1* | 2/2015 | Yoon | H01F 17/0013 336/192 |
| 2015/0357115 | A1* | 12/2015 | Ohkubo | H01F 27/2804 336/192 |
| 2015/0371757 | A1 | 12/2015 | Takezawa | |
| 2016/0099100 | A1 | 4/2016 | Park et al. | |
| 2016/0141102 | A1* | 5/2016 | Tseng | H01F 27/292 336/200 |
| 2017/0103846 | A1 | 4/2017 | Yoneda | |
| 2017/0110236 | A1* | 4/2017 | Jang | H01F 41/10 |
| 2017/0345558 | A1* | 11/2017 | Sekiguchi | H01F 27/29 |
| 2018/0012696 | A1* | 1/2018 | Lee | H01F 17/0013 |
| 2018/0012700 | A1* | 1/2018 | Lee | H01F 17/0013 |
| 2018/0342341 | A1* | 11/2018 | Aoki | H01G 4/30 |
| 2018/0374621 | A1* | 12/2018 | Sekiguchi | H01F 5/04 |
| 2019/0006071 | A1* | 1/2019 | Sekiguchi | H01F 17/0013 |
| 2019/0006084 | A1* | 1/2019 | Shiga | H01F 5/04 |

FOREIGN PATENT DOCUMENTS

| | | | |
|---|---|---|---|
| JP | 2010165975 | A * | 7/2010 |
| JP | 2013-098356 | A | 5/2013 |
| JP | 2018-200966 | A | 12/2018 |
| JP | 2019-012789 | A | 1/2019 |
| WO | 2007/080680 | A1 | 7/2007 |

OTHER PUBLICATIONS

An Office Action issued by the China National Intellectual Property Administration on Aug. 5, 2020, which corresponds to Chinese Patent Application No. 201810666257.9 and is related to U.S. Appl. No. 16/039,023 with English language translation.

* cited by examiner

INDUCTOR COMPONENT

CROSS REFERENCE TO RELATED APPLICATION

This application is a Divisional of U.S. patent application Ser. No. 16/039,023 filled on Jul. 18, 2018, which claims benefit of priority to Japanese Patent Application 2017-155697 filed Aug. 10, 2017, the entire content of which is incorporated herein by reference.

BACKGROUND

Technical Field

The present disclosure relates to an inductor component

Background Art

A conventional inductor component is described in Japanese Laid-Open Patent Publication No. 2013-98356. This inductor component has an element body, a coil disposed in the element body, and an external electrode embedded in the element body and electrically connected to the coil. The external electrode is disposed over an end surface and a bottom surface of the element body.

SUMMARY

The inventor of the present application found that cracking or chipping may occur in the element body when it is attempted to manufacture and use the conventional inductor component as described above. As a result of intensive studies on this phenomenon, it was found that cracking or chipping of the element body is attributable to an amount of an external electrode embedded in the element body. More specifically, a large embedded amount of the external electrode results in an increase in internal stress of the element body generated due to difference in expansion coefficient and elastic modulus between the external electrode and the element body. Therefore, when a thermal stress is applied at the time of manufacturing or in use, or when a mechanical stress is applied at the time of mounting, cracking or chipping may occur in the element body.

Therefore, the present disclosure provides an inductor component in which occurrence of cracking or chipping is suppressed.

Accordingly, an aspect of the present disclosure provides an inductor component comprising an element body including a first end surface and a second end surface opposite to each other and a bottom surface connected between the first end surface and the second end surface; a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil. The first external electrode has an end edge extending in a direction orthogonal to the vertical plane, and wherein the end edge is formed into an uneven shape. In this description, the bottom surface is a surface from which both the first external electrode and the second external electrode are exposed, and is a mounting surface for mounting the inductor component on a mounting board.

According to the inductor component of the present disclosure, since the first external electrode is embedded in the bottom surface of the element body and has the first end edge with an uneven shape, an amount of the first external electrode embedded in the element body is reduced as compared to when the end edge is a straight line. This leads to a reduction in the internal stress of the element body generated due to difference in expansion coefficient and elastic modulus between the first external electrode and the element body. Therefore, even when a thermal stress is applied at the time of manufacturing or in use, or even when a mechanical stress is applied at the time of mounting, the occurrence of cracking or chipping of the element body is suppressed.

In an embodiment of the inductor component, the first external electrode is exposed from the first end surface over the bottom surface. According to the embodiment, since the first external electrode is exposed from the first end surface over the bottom surface, a fixing force of the inductor component is improved by formation of a solder fillet on the end surface.

In an embodiment of the inductor component, the end edge is at least one of a first end edge exposed at least on the bottom surface and a second end edge exposed on the first end surface. According to the embodiment, since the end edge is at least one of the first end edge and the second end edge, the amount of the first external electrode embedded in the element body is reduced. Therefore, the internal stress of the element body is reduced, and the occurrence of cracking or chipping of the element body is suppressed.

In an embodiment of the inductor component, the end edge is both the first end edge and the second end edge. According to the embodiment, since the end edge is both the first end edge and the second end edge, the amount of the first external electrode embedded in the element body is further reduced. Therefore, the internal stress of the element body is further reduced, and the occurrence of cracking or chipping of the element body is further suppressed.

In an embodiment of the inductor component, the first external electrode has a first portion extending along the bottom surface and a second portion extending along the end surface. According to the embodiment, since the first external electrode has the first portion extending along the bottom surface and the second portion extending along the end surface, the region of formation of the coil conductor layer can be enlarged, and a parasitic capacitance between the coil conductor layer and the first external electrode can be reduced to improve the Q-value.

In an embodiment of the inductor component, the thickness of the first portion is smaller than the thickness of the second portion. According to the embodiment, since the thickness of the first portion is smaller than the thickness of the second portion, the amount of the first external electrode embedded in the element body is reduced as compared to when the thickness of the first portion is the same as the thickness of the second portion. Therefore, the internal stress of the element body is reduced, and the occurrence of cracking or chipping of the element body is suppressed. Particularly, since the thickness of the first portion of the bottom surface of the first external electrode is small, the stress applied to the bottom surface of the element body is reduced at the time of mounting.

In an embodiment of the inductor component, the first end edge has a recess with a depth of 20 μm or more. According to the embodiment, since the first end edge has a recess with a depth of 20 μm or more, the amount of the external electrode embedded in the element body is reduced. Therefore, the internal stress of the element body is reduced, and the occurrence of cracking or chipping of the element body is suppressed. A distance of a straight line connecting the bottom of the recess and the outer surface of the element body in the shortest avoiding the external electrode is increased, so that the cracking of the element body along this straight line can be reduced.

In an embodiment of the inductor component, the end edge has a recess with a depth equal to or greater than half of a size of the first external electrode in a direction orthogonal to the extending direction of the end edge. According to the embodiment, since the end edge has a recess with a depth equal to or greater than half of a size of the first external electrode in a direction orthogonal to the extending direction of the end edge, the amount of the first external electrode embedded in the element body is reduced. Therefore, the internal stress of the element body is reduced, and the occurrence of cracking or chipping of the element body is suppressed. A distance of a straight line connecting the bottom of the recess and the outer surface of the element body in the shortest avoiding the first external electrode is increased, so that the cracking of the element body along this straight line can be prevented.

In an embodiment of the inductor component, the first external electrode includes multiple external electrode conductor layers formed on the vertical plane and each of multiple planes parallel to the vertical plane, and an interlayer external electrode conductor layer connecting two adjacent layers of the multiple external electrode conductor layers. The interlayer external electrode conductor layers are smaller than the external electrode conductor layers so that the uneven shape of the end edge is formed. According to the embodiment, since the first external electrode includes multiple external electrode conductor layers and an interlayer external electrode conductor layer connecting two adjacent layers of the multiple external electrode conductor layers, the reliability of connection of the first external electrode can be improved.

In an embodiment of the inductor component, the first external electrode includes multiple external electrode conductor layers formed on the vertical plane and each of multiple planes parallel to the vertical plane, and two adjacent layers of the multiple external electrode conductor layers are separated by a separation groove so that the uneven shape of the end edge is formed. According to the embodiment, since two adjacent layers of the multiple external electrode conductor layers are separated by a separation groove so that the uneven shape of the end edge is formed, the amount of the first external electrode embedded in the element body is reduced. Therefore, the internal stress of the element body is reduced, and the occurrence of cracking or chipping of the element body is suppressed.

An embodiment of the inductor component provides an inductor component comprising an element body including a first end surface and a second end surface opposite to each other and a bottom surface connected between the first end surface and the second end surface; a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil. The first external electrode has a first portion extending along the bottom surface and a second portion extending along the end surface, and wherein the thickness of the first portion is smaller than the thickness of the second portion.

According to the embodiment, since the thickness of the first portion is smaller than the thickness of the second portion, the amount of the first external electrode embedded in the element body is reduced as compared to when the thickness of the first portion is the same as the thickness of the second portion. This leads to a reduction in the internal stress of the element body generated due to difference in expansion coefficient and elastic modulus between the first external electrode and the element body. Therefore, even when a thermal stress is applied at the time of manufacturing or in use, or even when a mechanical stress is applied at the time of mounting, the occurrence of cracking or chipping of the element body is suppressed.

According to the inductor component of an aspect of the present disclosure, occurrence of cracking or chipping of the element body can be suppressed.

DETAILED DESCRIPTION

An aspect of the present disclosure will be described in detail with reference to shown embodiments.

First Embodiment

Figure 1:
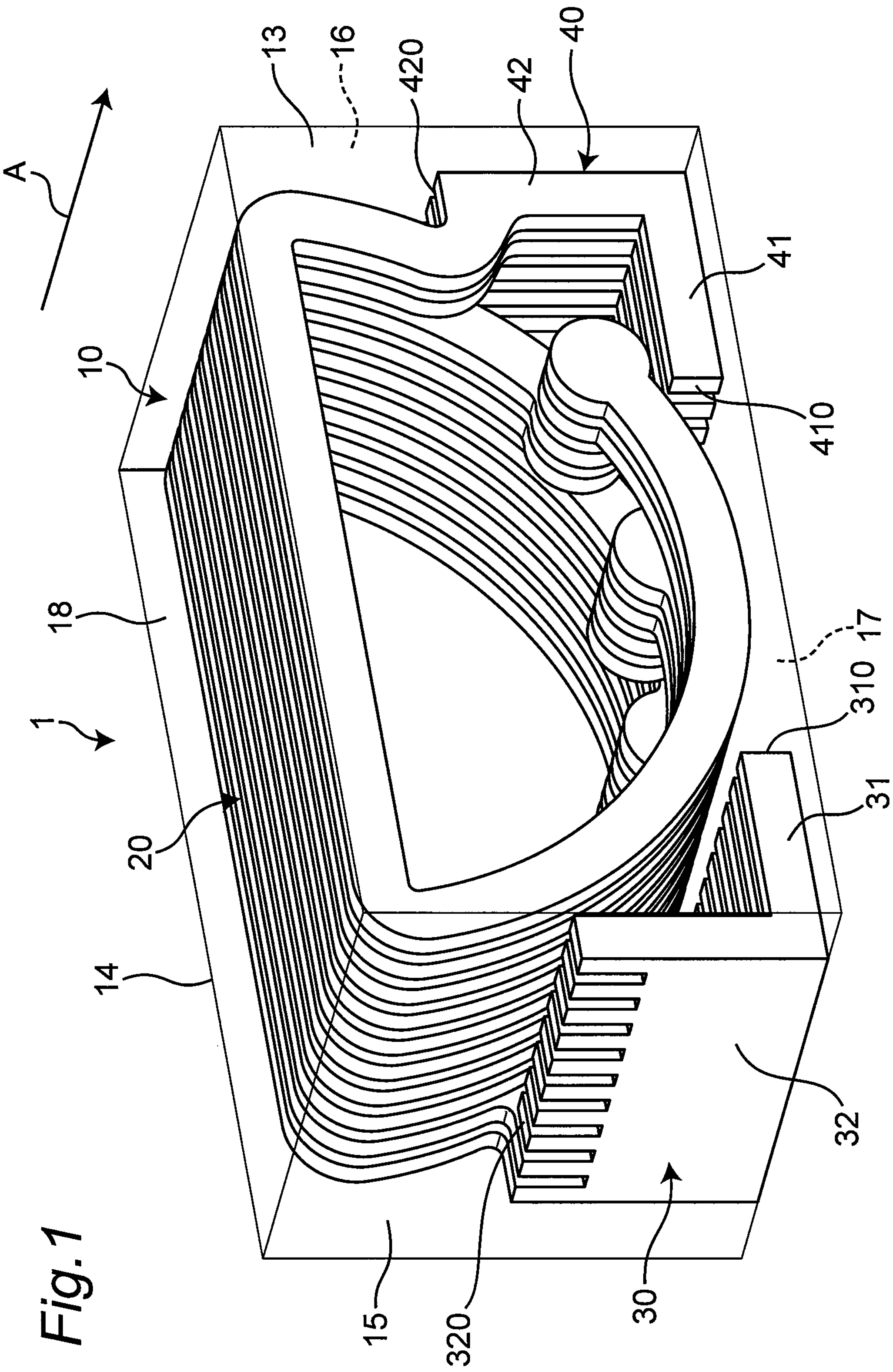
FIG. 1 is a transparent perspective view of a first embodiment of an inductor component.
Figure 2:
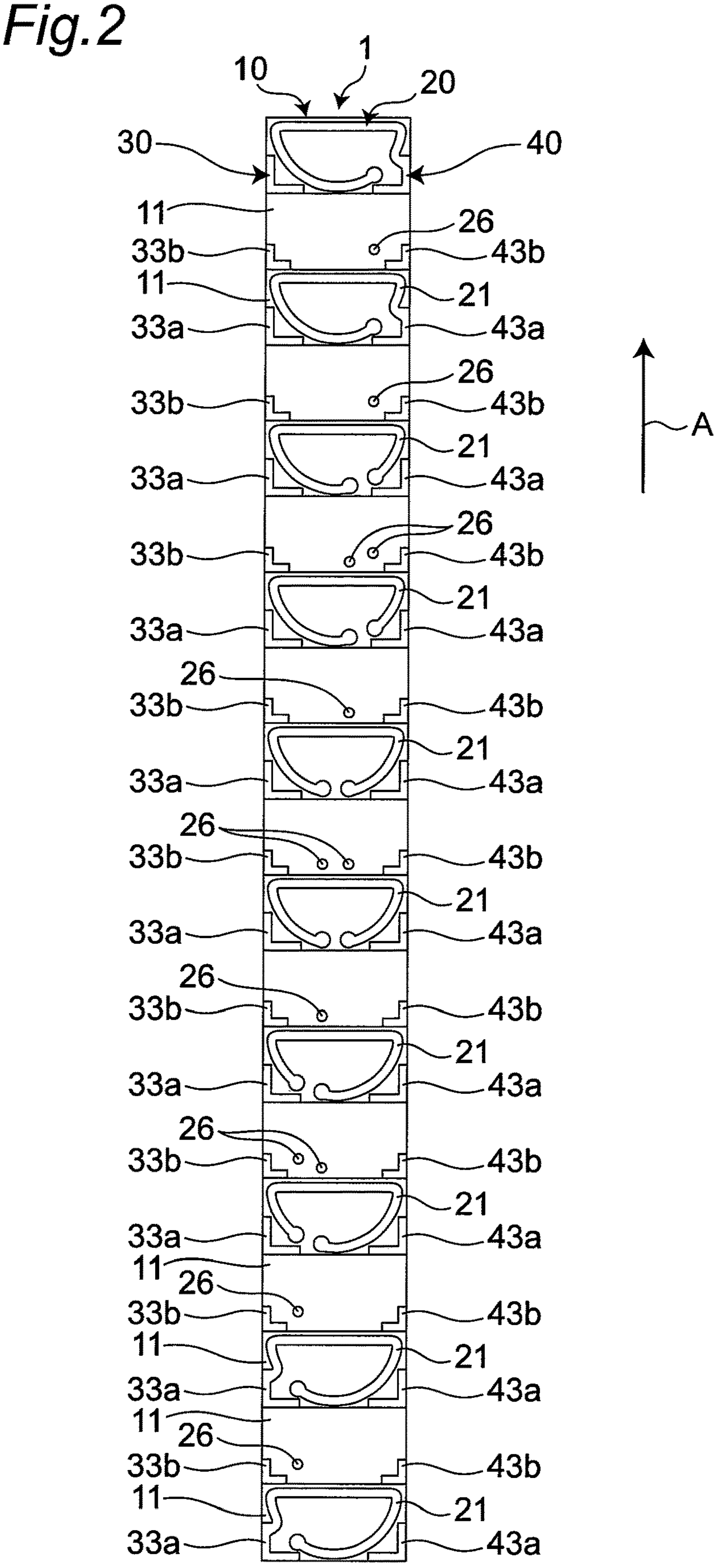
FIG. 2 is an exploded plane view of the inductor component.

FIG. 1 is a transparent perspective view of a first embodiment of an inductor component. FIG. 2 is an exploded plane view of the inductor component. As shown in FIGS. 1 and 2, the inductor component 1 includes an element body 10, a helical coil 20 disposed inside the element body 10, and a first external electrode 30 and a second external electrode 40 disposed in the element body 10 and electrically connected to the coil 20. Although depicted as being transparent in FIG. 1 so that a structure can easily be understood, the element body 10 may be semitransparent or opaque.

The inductor component 1 is electrically connected via the first and second external electrodes 30, 40 to a wiring of a circuit board not shown. The inductor component 1 is used as an impedance matching coil (matching coil) of a high-frequency circuit, for example, and is used for an electronic device such as a personal computer, a DVD player, a digital camera, a TV, a portable telephone, automotive electronics, and medical/industrial machines. However, the inductor component 1 is not limited to these uses and is also usable for a tuning circuit, a filter circuit, and a rectifying/smoothing circuit, for example.

The element body 10 has multiple insulating layers 11. The multiple insulating layers 11 are laminated along a lamination direction A. The insulating layers 11 are made of, for example, a material mainly composed of borosilicate glass or a material such as ferrite and resin. In the element body 10, an interface between the multiple insulating layers 11 may not be clear due to firing etc.

The element body 10 is formed into a substantially rectangular parallelepiped shape. The surface of the element body 10 has a first end surface 15 and a second end surface 16 opposite to the first end surface 15 as well as a first side surface 13, a second side surface 14, a bottom surface 17, and a top surface 18 connected between the first end surface 15 and the second end surface 16. The first side surface 13 and the second side surface 14 are opposite to each other, and the bottom surface 17 and the top surface 18 are opposite to each other. The first side surface 13 and the second side surface 14 are opposite to each other in the laminating direction A. The bottom surface 17 is a mounting surface for mounting the inductor component 1 on a mounting board.

The coil 20 is made of a conductive material such as Ag, Cu, Au, and an alloy mainly composed thereof, for example. The coil 20 is helically wound along the lamination direction A of the insulating layers 11. An axis of the coil 20 is parallel to the bottom surface 17 of the element body 10. The axis of the coil 20 means the center axis of the helical shape of the coil 20.

The coil 20 includes multiple coil conductor layers 21 wound in a planar shape on the insulating layers 11. A principal plane of the insulating layer 11 is a vertical plane for the first end surface 15, the second end surface 16, and the bottom surface 17. Since the coil 20 is made up of the coil conductor layers 21 that can be microfabricated in this way, the inductor component 1 can be reduced in size and height. The coil conductor layers 21 adjacent in the lamination direction A are electrically connected in series through via conductor layers 26 penetrating the insulating layers 11 in the thickness direction. The multiple coil conductor layers 21 are electrically connected to each other in series in this way to constitute a helix. Specifically, the coil 20 has a configuration in which the multiple coil conductor layers 25 electrically connected to each other in series and having the number of turns less than one are laminated, and the coil 20 has a helical shape. In this case, a parasitic capacitance generated in the coil conductor layers 21 and a parasitic capacitance generated between the coil conductor layers 21 can be reduced, and the Q-value of the inductor component 1 can be improved.

One end of the coil 20 is connected to the first external electrode 30 and the other end of the coil 20 is connected to the second external electrode 40. In this embodiment, the coil 20 and the first and second external electrodes 30, 40 are integrated without a clear boundary; however, this is not a limitation, and the coil and the external electrodes may be made of different materials or by different construction methods so that boundaries may exist.

The first external electrode 30 and the second external electrode 40 are made of a conductive material such as Ag, Cu, Au, and an alloy mainly composed thereof, for example. The first external electrode 30 has an L shape disposed over the first end surface 15 and the bottom surface 17. The second external electrode 40 has an L shape disposed over the second end surface 16 and the bottom surface 17. The first external electrode 30 and the second external electrode 40 are embedded in the element body 10 such that surfaces thereof are exposed.

The first external electrode 30 has a first portion 31 extending along the bottom surface 17 of the element body 10 and a second portion 32 extending along the first end surface 15 of the element body 10. The first portion 31 is embedded in the element body 10 and exposed from the bottom surface 17. An exposed surface of the first portion 31 is located on the same plane as the bottom surface 17. The second portion 32 is embedded in the element body 10 and exposed from the first end surface 15. An exposed surface of the second portion 32 is located on the same plane as the first end surface 15.

The first external electrode 30 has pluralities of L-shaped external electrode conductor layers **33*a* and interlayer external electrode conductor layers 33*b*. The pluralities of the external electrode conductor layers 33*a* and the interlayer external electrode conductor layers 33*b* are embedded in the element body 10 (the insulating layers 11). The interlayer external electrode conductor layers 33*b* are smaller than the external electrode conductor layers 33*a* in the same layers as the coil conductor layers 21. Therefore, the interlayer external electrode conductor layers 33*b* are smaller than the external electrode conductor layers 33*a* in the size in the direction orthogonal to the first and second end surfaces 15, 16 and in the size in the direction orthogonal to the bottom surface 17**.

The interlayer external electrode conductor layers **33*b* and the external electrode conductor layers 33*a* are alternately laminated in the lamination direction A. Therefore, the interlayer external electrode conductor layers 33*b* having a small embedded amount in the element body 10 and the external electrode conductor layers 33*a* having a large embedded amount in the element body 10** are alternately arranged.

Similar to the first external electrode 30, the second external electrode 40 has a first portion 41 embedded in the bottom surface 17 and a second portion 42 embedded in the second end surface 16. Similar to the first external electrode 30, the second external electrode 40 has external electrode conductor layers **43*a* and interlayer external electrode conductor layers 43*b***.

Since the first and second external electrodes 30, 40 can be embedded in the element body 10, the inductor component 1 can be reduced in size as compared to a configuration in which the external electrodes are externally attached to the element body 10. Additionally, the coil 20 and the first and second external electrodes 30, 40 can be formed in the same steps, so that variations in the positional relationship between the coil 20 and the first and second external electrodes 30, 40 can be reduced to decrease variations in electrical characteristics of the inductor component 1.

Since the first and second external electrodes 30, 40 of the L-shaped electrodes face the outer circumference of the coil 20 and do not overlap with the axis of the coil 20, a proportion of the magnetic flux of the coil 20 blocked by the first and second external electrodes 30, 40 can be reduced, and an eddy current loss generated by the first and second external electrodes 30, 40 is reduced, so that a reduction in the Q value of the coil 20 can be suppresses.

Figure 3A:
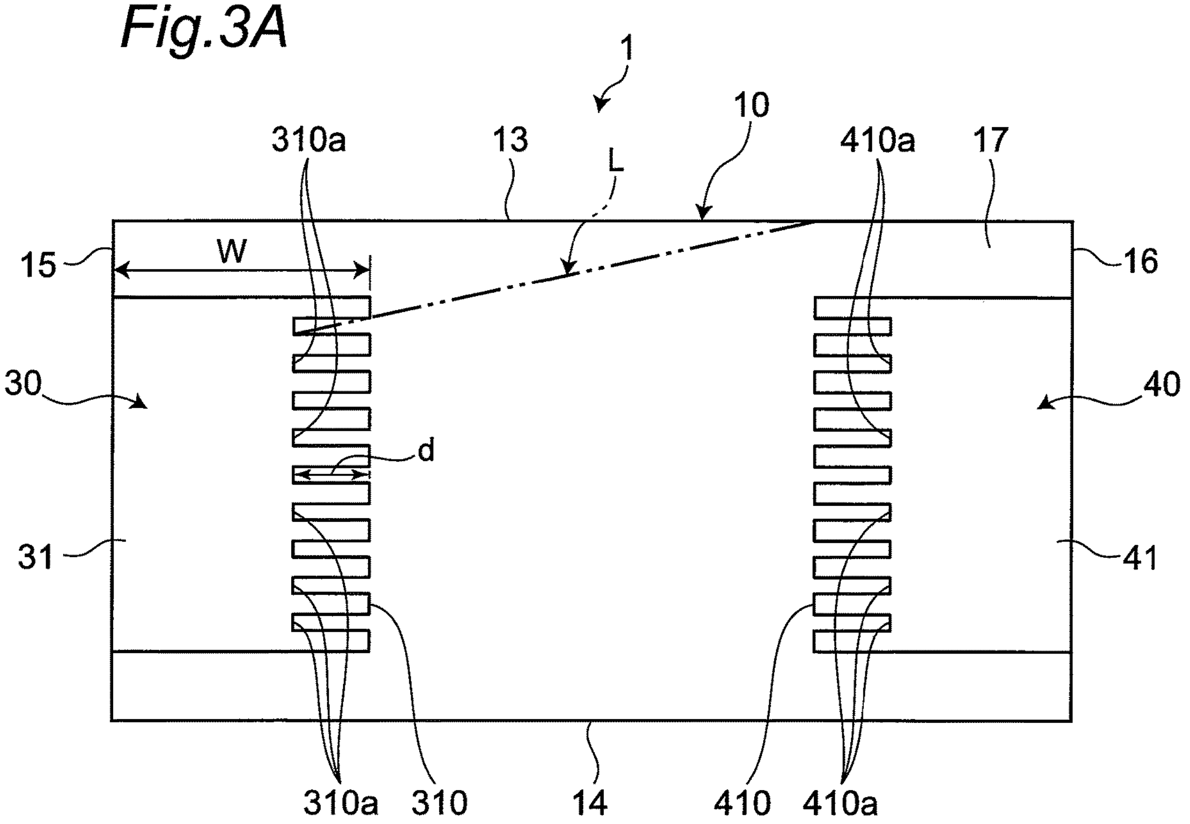
FIG. 3A is a bottom view of the inductor component.

FIG. 3A shows a bottom view of the inductor component 1. As shown in FIG. 3A, on the bottom surface 17, the first external electrode 30 has a first end edge 310 that is located on the inner side of the element body 10 in a direction orthogonal to the first end surface 15 and that is along the first end surface 15. Therefore, the first portion 31 has the first end edge 310 on the side opposite to the first end surface 15. The first end edge 310 is formed into an uneven shape. Multiple recesses **310*a* are arranged in parallel along the first end surface 15. Therefore, the shape of the first end edge 310 is a comb shape. As shown in FIG. 2, the interlayer external electrode conductor layers 33***b* are smaller than the external electrode conductor layers 33*a*, so that the uneven shape of the first end edge 310 is formed.

Therefore, the first external electrode 30 is embedded and exposed from the bottom surface 17 of the element body 10, and since the first external electrode 30 has the first end edge 310 with an uneven shape, an amount of the first external electrode 30 embedded in the element body 10 is reduced as compared to when the first end edge 310 is a straight line. This leads to a reduction in the internal stress of the element body 10 generated due to difference in expansion coefficient and elastic modulus between the first external electrode 30 and the element body 10. Thus, even when a thermal stress is applied at the time of manufacturing (firing etc.) or in use (ambient environment, etc.), or even when a mechanical stress is applied at the time of mounting (soldering etc.), the occurrence of cracking or chipping of the element body 10 is suppressed.

Preferably, a depth d of the recesses 310*a* of the first end edge 310 shown in FIG. 3A is 20 μm or more. As a result, the amount of the first external electrode 30 embedded in the element body 10 is reduced. Therefore, the internal stress of the element body 10 is reduced, and the occurrence of cracking or chipping of the element body 10 is suppressed.

A distance of a straight line L connecting the bottom of the recess 310*a* and the outer surface of the element body 10 in the shortest avoiding the first external electrode 30 is increased, so that the cracking of the element body 10 along the straight line L can be prevented. Specifically, a stress tends to concentrate near the bottom of the recess 310*a*, and this portion possibly acts as a starting point of occurrence of cracking of the element body 10 along the straight line L; however, since the depth d is 20 μm or more and increases the distance of the straight line L, cracking of the element body 10 can be restrained from reaching the outer surface of the element body 10.

Preferably, the depth d of the recess 310*a* of the first end edge 310 is equal to or greater than half of a size W of the first external electrode 30 in the direction orthogonal to the extending direction of the first end edge 310. As a result, the amount of the first external electrode 30 embedded in the element body 10 is reduced. Therefore, the internal stress of the element body 10 is reduced, and the occurrence of cracking or chipping of the element body 10 is suppressed. Even if cracking occurs in the element body 10, the cracking can be restrained from reaching the outer surface of the element body 10.

As shown in FIG. 3A, on the bottom surface 17, the second external electrode 40 has a first end edge 410 that is located on the inner side of the element body 10 in a direction orthogonal to the second end surface 16 and that is along the second end surface 16. The first end edge 410 is formed into an uneven shape. The configuration of the first end edge 410 of the second external electrode 40 is the same configuration as the first end edge 310 of the first external electrode 30. Therefore, the amount of the second external electrode 40 embedded in the element body 10 is reduced, and the internal stress of the element body 10 is reduced. Preferably, a depth of recesses 410*a* of the first end edge 410 of the second external electrode 40 is the same as the depth d of the recesses 310*a* of the first end edge 310 of the first external electrode 30.

Figure 3B:
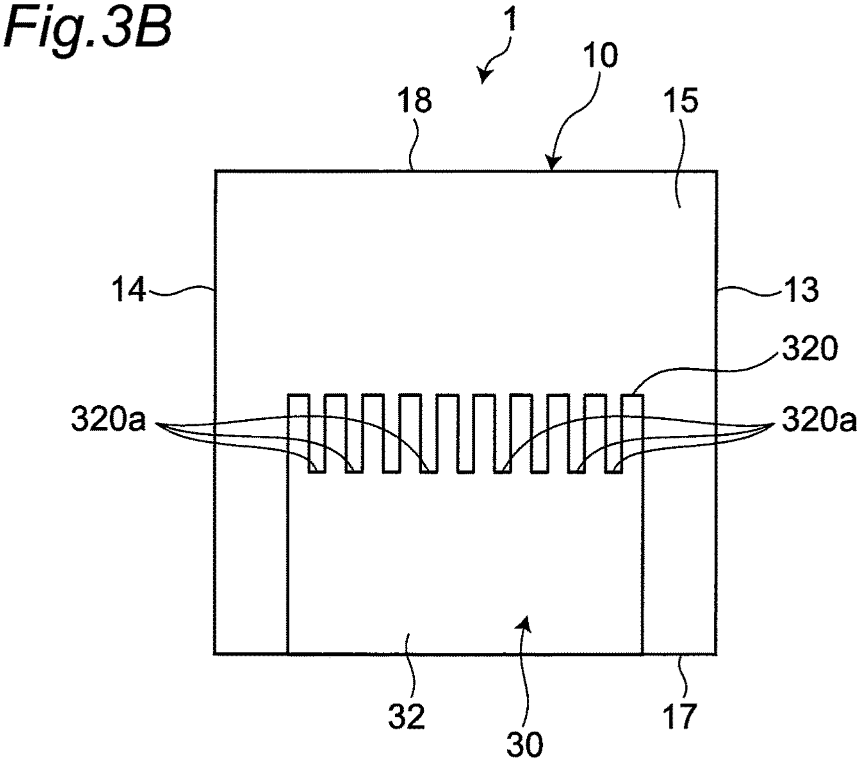
FIG. 3B is an end view of the inductor component.

FIG. 3B shows an end view of the inductor component 1. As shown in FIG. 3B, on the first end surface 15, the first external electrode 30 has a second end edge 320 that is located on the inner side of the element body 10 in a direction orthogonal to the bottom surface 17 and that is along the bottom surface 17. The second end edge 320 is formed into an uneven shape. The configuration of the second end edge 320 is the same configuration as the first end edge 310. Therefore, as compared to when the second end edge 320 is a straight line, the amount of the second external electrode 40 embedded in the element body 10 is reduced, and the internal stress of the element body 10 is reduced. Preferably, a depth of recesses 320*a* of the second end edge 320 is the same as the depth d of the recesses 310*a* of the first end edge 310. Since the first external electrode 30 is exposed from the first end surface 15, a fixing force of the inductor component 1 is improved by formation of a solder fillet on the first end surface 15.

As shown in FIG. 1, on the second end surface 16, the second external electrode 40 has a second end edge 420 that is located on the inner side of the element body 10 in a direction orthogonal to the bottom surface 17 and that is along the bottom surface 17. The second end edge 420 is formed into an uneven shape. The configuration of the second end edge 420 of the second external electrode 40 is the same configuration as the first end edge 310 of the first external electrode 30. Therefore, the amount of the second external electrode 40 embedded in the element body 10 is reduced, and the internal stress of the element body 10 is reduced. Preferably, a depth of recesses of the second end edge 420 of the second external electrode 40 is the same as the depth d of the recesses 310*a* of the first end edge 310 of the first external electrode 30.

In the embodiment, the first and second end edges 310, 320 of the first external electrode 30 and the first and second end edges 410, 420 of the second external electrode 40 are all formed into the uneven shape; however, at least the first end edge 310 of the first external electrode 30 may be formed into the uneven shape. As a result, the amount of the external electrode embedded in the element body 10 is reduced, and the internal stress of the element body 10 is reduced.

Second Embodiment

Figure 4:
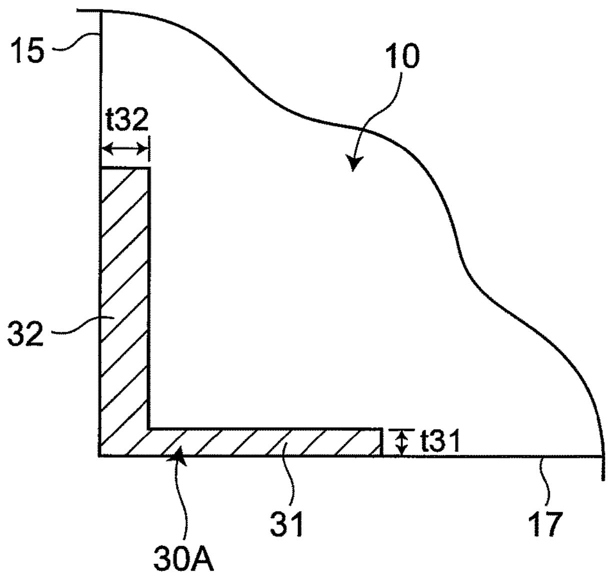
FIG. 4 is a cross-sectional view of a second embodiment of the inductor component.

FIG. 4 is a cross-sectional view of a second embodiment of the inductor component. The second embodiment is different from the first embodiment in the thickness of the external electrodes. This different configuration will hereinafter be described. The other constituent elements are configured as in the first embodiment and denoted by the same reference numerals as the first embodiment and will not be described.

As shown in FIG. 4, a thickness $t_{31}$ of the first portion 31 of a first external electrode 30A is smaller than a thickness $t_{32}$ of the second portion 32 of a first external electrode 30A. Consequently, as compared to when the thickness of the first portion 31 is the same as the thickness of the second portion 32, the amount of the first external electrode 30A embedded in the element body 10 is reduced. Therefore, the internal stress of the element body 10 is reduced, and the occurrence of cracking or chipping of the element body 10 is suppressed. Particularly, since the thickness $t_{31}$ of the first portion 31 is small, the stress applied to the bottom surface 17 of the element body 10 is reduced at the time of mounting. The second external electrode may have the same configuration as the first external electrode 30A, and the amount of the second external electrode embedded in the element body 10 is reduced.

Third Embodiment

Figure 5:
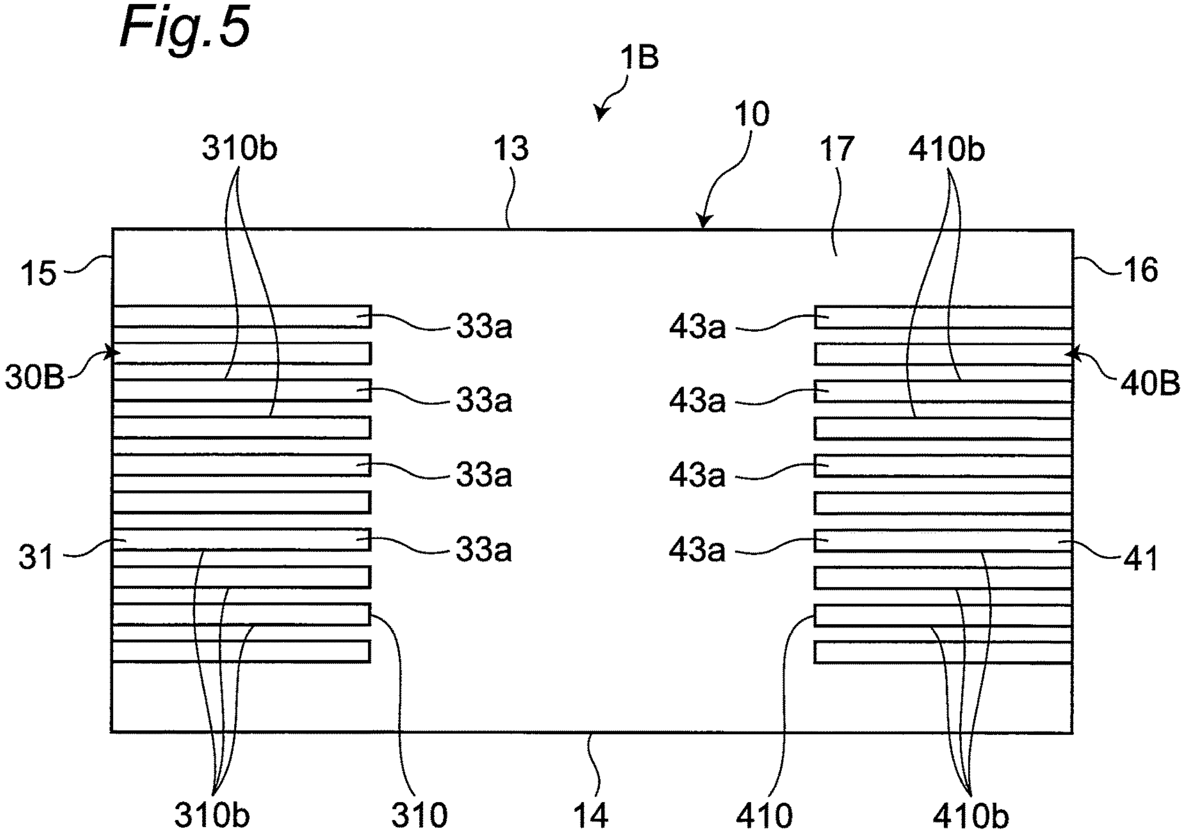
FIG. 5 is a bottom view of a third embodiment of the inductor component.

FIG. 5 is a bottom view of a third embodiment of the inductor component, designated as inductor component 1B. The third embodiment is different from the first embodiment in the configuration of the external electrodes. This different configuration will hereinafter be described. The other constituent elements are configured as in the first embodiment and denoted by the same reference numerals as the first embodiment and will not be described.

As shown in FIG. 5, a first external electrode 30B includes multiple external electrode conductor layers 33*a* formed on the vertical plane and each of multiple planes parallel to the vertical plane. Two adjacent layers of the multiple external electrode conductor layers 33*a* are separated by a separation groove 310*b*, so that the uneven shape of the first end edge 310 is formed.

Specifically, on the bottom surface 17, the first external electrode 30B has the multiple separation grooves 310*b* extending in a direction intersecting with the first end surface 15. The multiple separation grooves 310*b* are arranged along the first end surface 15 and constitute recesses of the first end edge 310. The separation grooves 310*b* penetrate the first end edge 310 of the first portion 31 and the first end surface 15. Therefore, the first portion 31 is divided into multiple strips along the first end surface 15. As a result, the amount of the first external electrode 30B embedded in the element body 10 is reduced. Therefore, the internal stress of the element body 10 is reduced, and the occurrence of cracking or chipping of the element body 10 is suppressed. Although extending in the direction orthogonal to the first end surface 15, the separation grooves 310*b* may extend in a direction inclined to the first end surface 15.

Similarly, a second external electrode 40B includes multiple external electrode conductor layers 43*a* formed on the vertical plane and each of multiple planes parallel to the vertical plane. Two adjacent layers of the multiple external electrode conductor layers 43*a* are separated by a separation groove 410*b*, so that the uneven shape of the first end edge 410 is formed. As a result, the amount of the second external electrode 40B embedded in the element body 10 is reduced.

A second portion of the first external electrode 30B and a second portion of the second external electrode 40B may have the same configuration as the first portion 31 of the first external electrode 30B, or at least the first portion 31 of the first external electrode 30B may have the separation groove 310*b*.

Fourth Embodiment

Figure 6A:
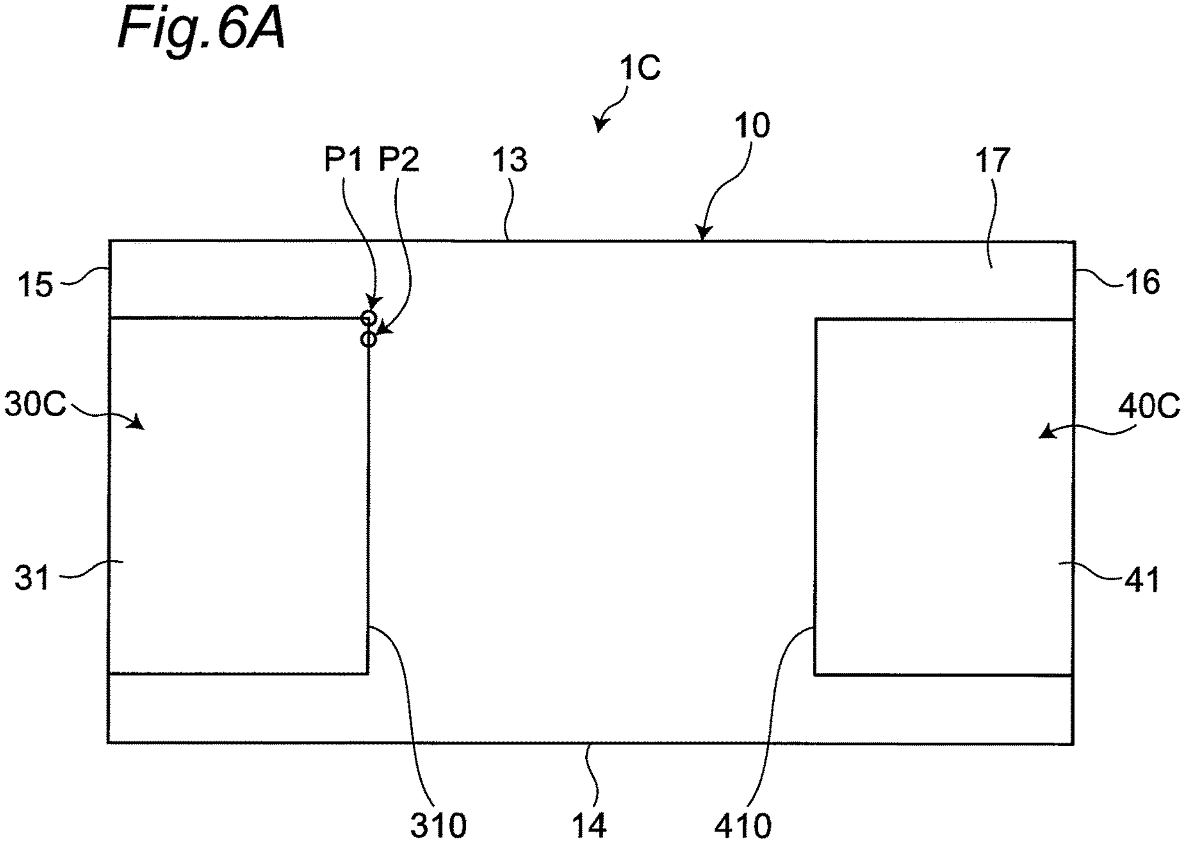
FIG. 6A is a bottom view of a fourth embodiment of the inductor component.
Figure 6B:
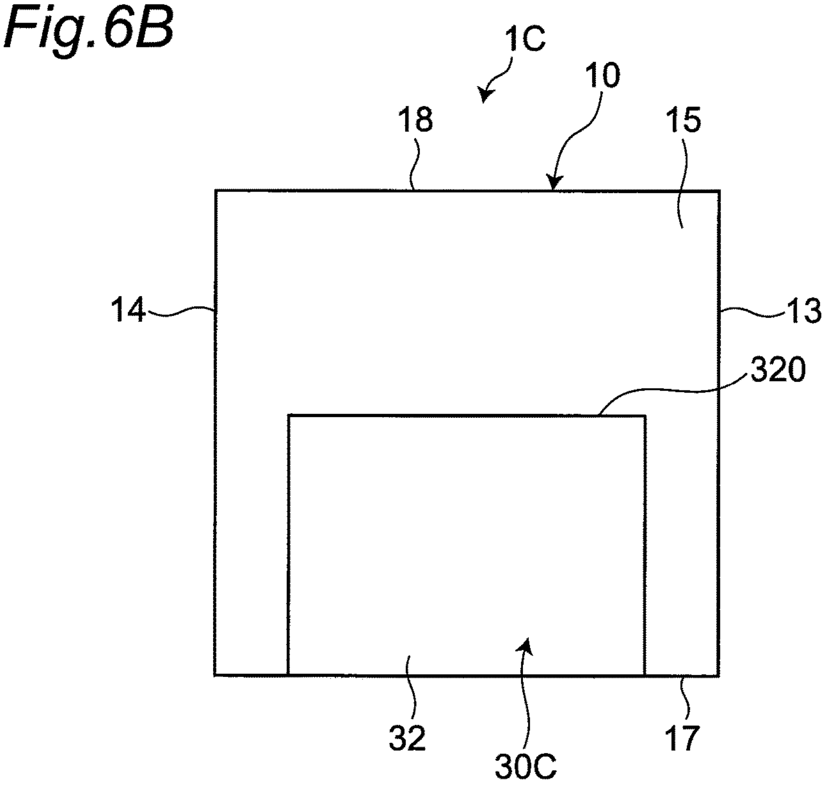
FIG. 6B is an end view of the fourth embodiment of the inductor component.
Figure 6C:
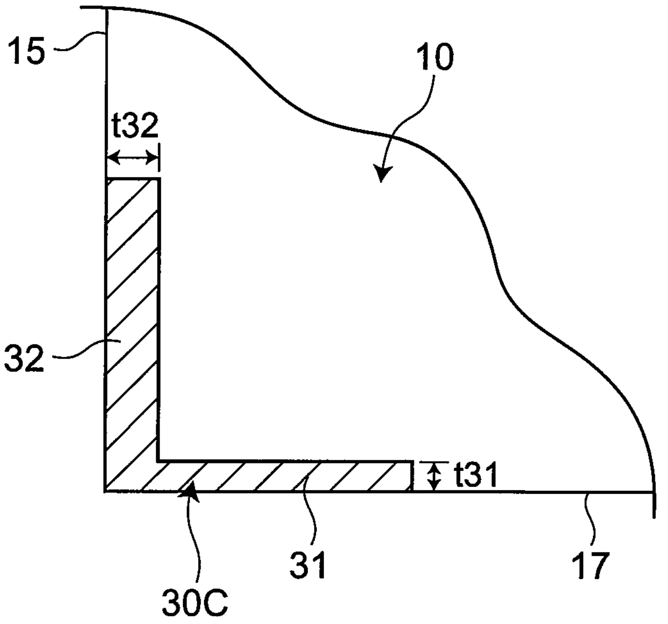
FIG. 6C is a cross-sectional view of the fourth embodiment of the inductor component.

FIG. 6A is a bottom view of a fourth embodiment of the inductor component, designated as inductor component 1C. FIG. 6B is an end view of the fourth embodiment of the inductor component 1C. FIG. 6C is a cross-sectional view of the fourth embodiment of the inductor component 1C. The fourth embodiment is different from the first embodiment in the configuration of the external electrodes. This different configuration will hereinafter be described. The other constituent elements are configured as in the first embodiment and denoted by the same reference numerals as the first embodiment and will not be described.

As shown in FIGS. 6A and 6B, the first end edge 310 and the second end edge 320 of a first external electrode 30C and the first end edge 410 and the second end edge of a second external electrode 40C are straight lines. These first and second end edges may be formed into an uneven shape similar to the first and second end edges of the first embodiment.

As shown in FIG. 6C, the thickness $t_{31}$ of the first portion 31 of the first external electrode 30C is smaller than the thickness $t_{32}$ of the second portion 32 of the first external electrode 30C. Consequently, as compared to when the thickness of the first portion 31 is the same as the thickness of the second portion 32, the amount of the first external electrode 30C embedded in the element body 10 is reduced. This leads to a reduction in the internal stress of the element body 10 generated due to difference in expansion coefficient and elastic modulus between the first external electrode 30C and the element body 10, and even when a thermal stress is applied at the time of manufacturing or in use, or even when a mechanical stress is applied at the time of mounting, the occurrence of cracking or chipping of the element body 10 is suppressed. Particularly, since the thickness $t_{31}$ of the first external electrode 30C is small, the stress applied to the bottom surface 17 of the element body 10 is reduced at the time of mounting.

The second external electrode 40C may have the same configuration as the first external electrode 30C, and the amount of the second external electrode 40C embedded in the element body 10 is reduced.

A relationship between the thickness $t_{31}$ of the first portion 31 of the first external electrode 30C and the internal stress of the element body 10 will be described.

As shown in FIG. 6A, while changing the thickness $t_{31}$ of the first portion 31, the internal stress of the element body 10 at a first measurement point P1 and a second measurement point P2 was measured in simulation. The first measurement point P1 indicates a vicinity of an end portion of the first end edge 310 close to the first side surface 13, and the second measurement point P2 indicates a vicinity of a portion of the first end edge 310 separated by 5 μm from the first measurement point P1 toward the second side surface 14.

Figure 7:
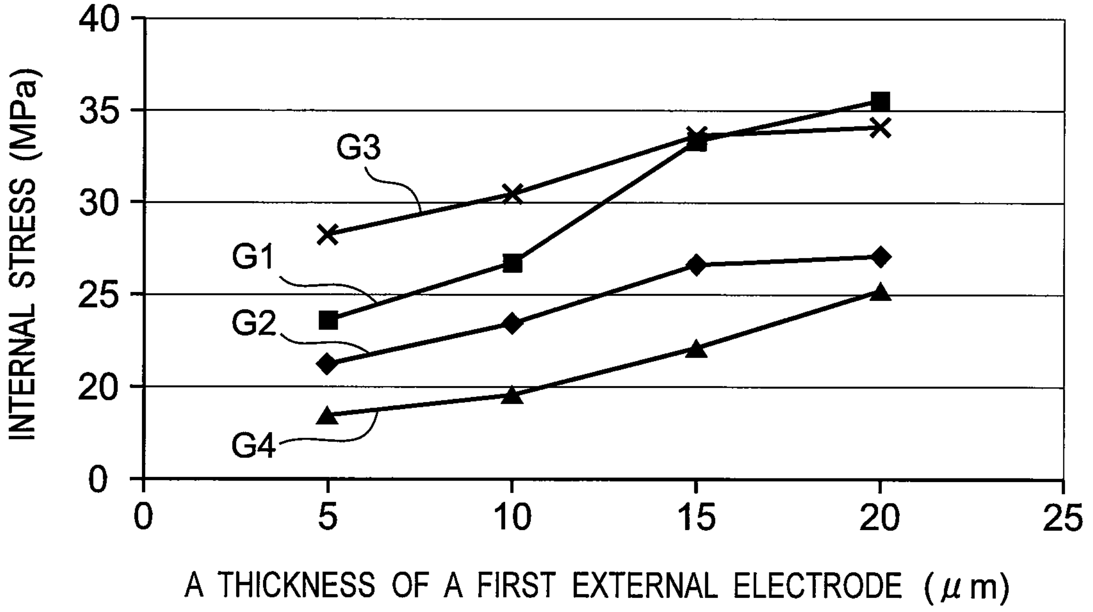
FIG. 7 is a graph of a relationship between a thickness of a first portion of a first external electrode and an internal stress of an element body.

FIG. 7 shows the relationship between the thickness $t_{31}$ of the first portion 31 of the first external electrode 30C and the internal stress of the element body 10. As shown in FIG. 7, the measurement result at the first measurement point P1 is a first graph G1, and the measurement result at the second measurement point P2 is a second graph G2. As can be seen from the first graph G1 and the second graph G2, when the thickness $t_{31}$ of the first portion 31 is smaller, the internal stress of the element body 10 is more reduced. At the first measurement point P1, the internal stress is larger than that at the second measurement point P2.

Additionally, the separation grooves 310*b* as shown in FIG. 5 were disposed in the first external electrode 30C, and the internal stress of the element body 10 was measured at the first measurement point P1 and the second measurement point P2. The measurement result at the first measurement point P1 is a third graph G3, and the measurement result at the second measurement point P2 is a fourth graph G4. As can be seen from the third graph G3 and the fourth graph G4, when the thickness $t_{31}$ of the first portion 31 is smaller, the internal stress of the element body 10 is more reduced. At the first measurement point P1, the internal stress is larger than that at the second measurement point P2.

The present disclosure is not limited to the embodiments described above and can be changed in design without departing from the spirit of the present disclosure. For example, respective feature points of the first to fourth embodiments may variously be combined.

Figure 8:
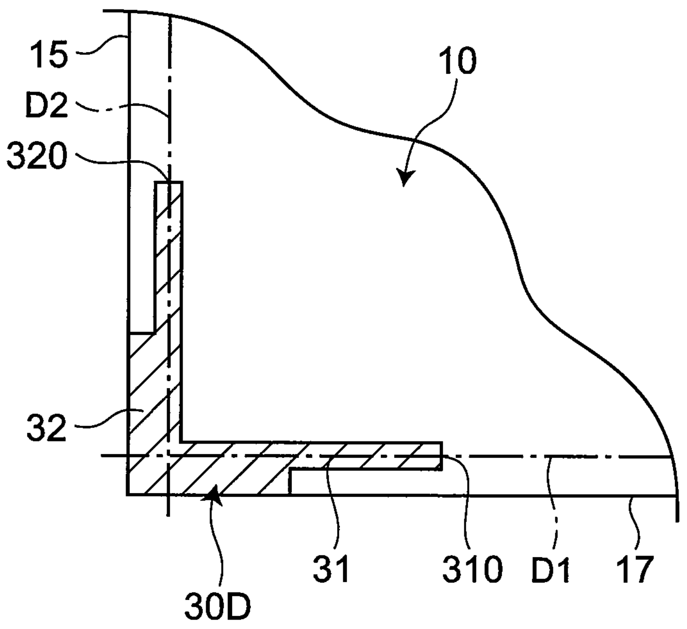
FIG. 8 is a cross-sectional view of another embodiment of the external electrode.

In the first to third embodiments, the external electrode has the first end edge with an uneven shape on the bottom surface of the element body. Therefore, the external electrode has the first end edge with an uneven shape on the surface of the external electrode exposed from the bottom surface. As shown in FIG. 8, a first external electrode 30D may have the first end edge 310 with an uneven shape in a cross section D1 parallel to the bottom surface 17 of the element body 10. Therefore, the external electrode may have the first end edge with an uneven shape in a portion covered with the bottom surface of the external electrode.

Similarly, in the first to third embodiments, the external electrode has the second end edge with an uneven shape on the end surface of the element body; however, as shown in FIG. 8, the first external electrode 30D may have the second end edge 320 with an uneven shape in a cross section D2 parallel to the first end surface 15 of the element body 10.

In the first to fourth embodiments, the external electrode is an L-shaped electrode; however, the external electrode may be a bottom electrode disposed only on the bottom surface of the element body. Both the first end edge and the second end edge may not be the end edges formed into an uneven shape, and only the first end surface or only the second end surface may have an uneven shape. Both or only one of the first and second external electrodes may have the end edge formed into an uneven shape.

Example

An example of a method of manufacturing the inductor component 1 will hereinafter be described.

First, an insulating layer is formed by repeatedly applying an insulating paste mainly composed of borosilicate glass onto a base material such as a carrier film by screen printing. This insulating layer serves as an outer-layer insulating layer located outside coil conductor layers. The base material is peeled off from the insulating layer at an arbitrary step and does not remain in the inductor component state.

Subsequently, a photosensitive conductive paste layer is applied and formed on the insulating layer to form a coil conductor layer and an external electrode conductor layer by a photolithography step. Specifically, the photosensitive conductive paste containing Ag as a main metal component is applied onto the insulating layer by screen printing to form the photosensitive conductive paste layer. Ultraviolet rays etc. are then applied through a photomask to the photosensitive conductive paste layer and followed by development with an alkaline solution etc. As a result, the coil conductor layer and the external electrode conductor layer are formed on the insulating layer. At this step, the coil conductor layer and the external electrode conductor layer can be drawn into a desired pattern with the photomask.

A photosensitive insulating paste layer is applied and formed on the insulating layer to form an insulating layer provided with an opening and a via hole by a photolithography step. Specifically, a photosensitive insulating paste is applied onto the insulating layer by screen printing to form the photosensitive insulating paste layer. Ultraviolet rays etc. are then applied through a photomask to the photosensitive insulating paste layer and followed by development with an alkaline solution etc. At this step, the photosensitive insulating paste layer is patterned so as to dispose the opening above the external electrode conductor layer and the via hole at an end portion of the coil conductor layer with the photomask.

Subsequently, a photosensitive conductive paste layer is applied and formed on the insulating layer provided with the opening and the via hole to form a coil conductor layer and an electrode conductor layer by a photolithography step. Specifically, a photosensitive conductive paste containing Ag as a main metal component is applied onto the insulating layer so as to fill the opening and the via hole by screen printing to form the photosensitive conductive paste layer. Ultraviolet rays etc. are then applied through a photomask to the photosensitive conductive paste layer and followed by development with an alkaline solution etc. This leads to the formation of the external electrode conductor layer connected through the opening to the external electrode conductor layer on the lower layer side and the coil conductor layer connected through the via hole to the coil conductor layer on the lower layer side.

The steps of forming the insulating layer as well as the coil conductor layer and the external electrode conductor layer as described above are repeated to form a coil made up of the coil conductor layers formed on the multiple insulating layers and external electrodes made up of the electrode conductor layers formed on the multiple insulating layers. An insulating layer is further formed by repeatedly applying an insulating paste by screen printing onto the insulating layer with the coil and the external electrodes formed. This insulating layer serves as an outer-layer insulating layer located outside the coil conductor layers. It is noted that if sets of coils and external electrodes are formed in a matrix shape on the insulating layers at the steps described above, a mother laminated body can be acquired.

Subsequently, the mother laminated body is cut into multiple unfired laminated bodies by dicing etc. At the step of cutting the mother laminated body, the external electrodes are exposed from the mother laminated body on a cut surface formed by cutting.

The unfired laminated bodies are fired under predetermined conditions to acquire element bodies including the coils and the external electrodes. These element bodies are subjected to barrel finishing for polishing into an appropriate outer shape size, and portions of the external electrodes exposed from the laminated bodies are subjected to Ni plating having a thickness of 2 μm to 10 μm and Sn plating having a thickness of 2 μm to 10 μm. Through the steps described above, inductor components of 0.4 mm×0.2 mm×0.2 mm are completed.

The construction method of forming the inductor component is not limited to the above method and, for example, the method of forming the coil conductor layers and the external electrode conductor layers may be a printing lamination construction method of a conductive paste using a screen printing plate opened in a conductor pattern shape, may be a method using etching or a metal mask for forming a pattern of a conductive film formed by a sputtering method, a vapor deposition method, pressure bonding of a foil, etc., or may be a method in which formation of a negative pattern is followed by formation of a conductor pattern with a plating film and subsequent removal of unnecessary portions as in a semi-additive method. Alternatively, the method may be achieved by using a method of transferring onto an insulating layer a conductor patterned on a substrate different from the insulating layer serving as the element body of the inductor component.

The method of forming the insulating layers as well as the openings and the via holes is not limited to the above method and may be a method in which after pressure bonding, spin coating, or spray application of an insulating material sheet, the sheet is opened by laser or drilling. If the end portions of the external electrodes are exposed from the side surfaces of the element body, the external electrode conductor layers may be formed in the outer-layer insulating layers.

The insulating material of the insulating layers is not limited to the ceramic material such as glass and ferrite as described above and may be an organic material such as an epoxy resin, a fluororesin, and a polymer resin, or may be a composite material such as a glass epoxy resin and, if the inductor component is used for a matching coil at high frequency, a material low in dielectric constant and dielectric loss is desirable.

The size of the inductor component is not limited to the above description. The method of forming the external electrodes is not limited to the method of applying plating to the external electrodes exposed by cutting and may be a method in which a coating film is further formed by dipping of a conductor paste, a sputtering method, etc. on the external electrodes exposed by cutting or plating is further be applied thereon. As in the case of forming the coating film or plating, the external electrodes may not be exposed to the outside of the electronic component. Therefore, the exposure of the external electrodes from the element body means that the external electrodes have portions not covered with the element body and the portions may be exposed to the outside of the inductor component or may be exposed to other members. If the coating film or the plating is formed on the external electrodes, the uneven shapes at the first and second end edges of the external electrodes may or may not be reflected in the end edge shape of the coating film or the plating.

What is claimed is:

1. An inductor component comprising:

an element body including a first end surface and a second end surface opposite to each other, and a bottom surface connected between the first end surface and the second end surface;

a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil, the first external electrode having a first portion extending along the bottom surface and a second portion extending along the first end surface, and a thickness of the first portion being smaller than a thickness of the second portion, wherein a side of the second portion of the first external electrode which is to be connected to the coil conductor layer is flat.

2. The inductor component according to claim 1, wherein the first external electrode is exposed from the first end surface over the bottom surface.

3. The inductor component according to claim 2, wherein the second portion of the first external electrode has a second end edge exposed on the first end surface.

4. The inductor component according to claim 2, wherein a first end edge of the first portion of the first external electrode has a recess with a depth of 20 μm or more.

5. The inductor component according to claim 2, wherein a first end edge of the first portion of the first external electrode has a recess with a depth equal to or greater than half of a size of the first external electrode in a direction orthogonal to the extending direction of the first end edge of the first portion of the first external electrode.

6. The inductor component according to claim 2, wherein the first external electrode includes multiple external electrode conductor layers formed on the vertical plane and each of multiple planes parallel to the vertical plane, and an interlayer external electrode conductor layer connecting two adjacent layers of the multiple external electrode conductor layers, and the interlayer external electrode conductor layers are smaller than the external electrode conductor layers so that an uneven shape of a first end edge of the first portion of the first external electrode is formed.

7. The inductor component according to claim 2, wherein the first external electrode includes multiple external electrode conductor layers formed on the vertical plane and each of multiple planes parallel to the vertical plane, and two adjacent layers of the multiple external electrode conductor layers are separated by a separation groove so that an uneven shape of a first end edge of the first portion of the first external electrode is formed.

8. The inductor component according to claim 2, wherein a first end edge of the first portion of the first external electrode extends in a direction orthogonal to the vertical plane, and the first end edge of the first portion of the first external electrode being formed into an uneven shape.

9. The inductor component according to claim 3, wherein a first end edge of the first portion of the first external electrode has a recess with a depth of 20 μm or more.

10. The inductor component according to claim 3, wherein a first end edge of the first portion of the first external electrode has a recess with a depth equal to or greater than half of a size of the first external electrode in a direction orthogonal to the extending direction of the first end edge of the first portion of the first external electrode.

11. The inductor component according to claim 3, wherein the first external electrode includes multiple external electrode conductor layers formed on the vertical plane and each of multiple planes parallel to the vertical plane, and an interlayer external electrode conductor layer connecting two adjacent layers of the multiple external electrode conductor layers, and the interlayer external electrode conductor layers are smaller than the external electrode conductor layers so that an uneven shape of a first end edge of the first portion of the first external electrode is formed.

12. The inductor component according to claim 3, wherein the first external electrode includes multiple external electrode conductor layers formed on the vertical plane and each of multiple planes parallel to the vertical plane, and two adjacent layers of the multiple external electrode conductor layers are separated by a separation groove so that an uneven shape of a first end edge of the first portion of the first external electrode is formed.

13. The inductor component according to claim 3, wherein a first end edge of the first portion of the first external electrode extends in a direction orthogonal to the vertical plane, and the first end edge of the first portion of the first external electrode being formed into an uneven shape.

14. The inductor component according to claim 1, wherein a first end edge of the first portion of the first external electrode has a recess with a depth of 20 μm or more.

15. The inductor component according to claim 1, wherein a first end edge of the first portion of the first external electrode has a recess with a depth equal to or greater than half of a size of the first external electrode in a direction orthogonal to the extending direction of the first end edge of the first portion of the first external electrode.

16. The inductor component according to claim 1, wherein the first external electrode includes multiple external electrode conductor layers formed on the vertical plane and each of multiple planes parallel to the vertical plane, and an interlayer external electrode conductor layer connecting two adjacent layers of the multiple external electrode conductor layers, and the interlayer external electrode conductor layers are smaller than the external electrode conductor layers so that an uneven shape of a first end edge of the first portion of the first external electrode is formed.

17. The inductor component according to claim 1, wherein the first external electrode includes multiple external electrode conductor layers formed on the vertical plane and each of multiple planes parallel to the vertical plane, and two adjacent layers of the multiple external electrode conductor layers are separated by a separation groove so that an uneven shape of a first end edge of the first portion of the first external electrode is formed.

18. The inductor component according to claim 1, wherein a first end edge of the first portion of the first external electrode extends in a direction orthogonal to the vertical plane, and the first end edge of the first portion of the first external electrode being formed into an uneven shape.

19. An inductor component comprising:

an element body including a first end surface and a second end surface opposite to each other, and a bottom surface connected between the first end surface and the second end surface;

a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil, the first external electrode having a first portion extending along the bottom surface and a second portion extending along the first end surface, and a thickness of the first portion being smaller than a thickness of the second portion, wherein the coil has a connection portion that is connected to the second portion of the first external electrode, and the connection portion extends from the second portion in a direction oblique to a direction of extension of the second portion, and wherein a side of the second portion of the first external electrode which is to be connected to the coil conductor layer is flat.

20. An inductor component comprising:

an element body including a first end surface and a second end surface opposite to each other, and a bottom surface connected between the first end surface and the second end surface;

a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil, the first external electrode having a first portion extending along the bottom surface and a second portion extending along the first end surface, and a thickness of the first portion being smaller than a thickness of the second portion, wherein the first external electrode does not protrude from the bottom surface and the first end surface and a length of the first portion is not shorter than a length of the second portion, and wherein a side of the second portion of the first external electrode which is to be connected to the coil conductor layer is flat.

21. The inductor component according to claim 20, wherein the first portion and the second portion are integrated.

22. The inductor component according to claim 20, wherein the length of the first portion is the same as the length of the second portion.

23. An inductor component comprising:

an element body including a first end surface and a second end surface opposite to each other, and a bottom surface connected between the first end surface and the second end surface;

a coil disposed in the element body and including a coil conductor layer wound in a planar shape on a vertical plane for the first end surface, the second end surface, and the bottom surface; and a first external electrode and a second external electrode embedded in the element body so as to be exposed from at least the bottom surface and electrically connected to the coil, the first external electrode having a first portion extending along the bottom surface and a second portion extending along the first end surface, and a thickness of the first portion being smaller than a thickness of the second portion, wherein a thickness of the first portion is less than 20 μm, and wherein a side of the second portion of the first external electrode which is to be connected to the coil conductor layer is flat.

* * * * *